United States Patent [19]

Hui et al.

[11] Patent Number: 5,377,125
[45] Date of Patent: Dec. 27, 1994

[54] IMPROVED PAD RING ROUTER

[75] Inventors: Siu-Tong Hui; Sunil Ashtaputre, both of San Jose, Calif.

[73] Assignee: VLSI Technology, Inc., San Jose, Calif.

[21] Appl. No.: 843,493

[22] Filed: Feb. 28, 1992

[51] Int. Cl.$^5$ .............................................. G06F 15/60
[52] U.S. Cl. ..................................... 364/491; 364/488; 364/489; 364/490
[58] Field of Search ................. 364/488, 489, 490, 491

[56] References Cited

U.S. PATENT DOCUMENTS

| | | | |
|---|---|---|---|
| 4,918,614 | 4/1990 | Modarres et al. | 364/490 |
| 5,072,402 | 12/1991 | Ashtaputre et al. | 364/491 |
| 5,119,314 | 6/1992 | Hotta et al. | 364/491 |
| 5,272,645 | 12/1993 | Kawakami et al. | 364/491 |

OTHER PUBLICATIONS

Richard K. McGehee, "A Practical Moat Router", 24th ACM/IEEE Design Automation Conference, 1987, pp. 216–221.
Jiri Soukup, "Circuit Layout", Proceedings of the IEEE, vol. 69, No. 10, Oct. 1981, pp. 1281–1304.
Chen, N. P., "New Algorithms for Steiner Tree of Graphs", Proceedings ISCAS, 1983, pp. 1217–1219.
Charles H. Ng, "An Industrial World Channel Router For Non-Rectangular Channels", 23rd Design Automation Conference, 1986, pp. 490–494.
D. Hsu, L. Grate, C. Ng, M. Hartoog, and D. Bohm, "The Chip Compiler, An Automated Standard Cell-/Macrocell Physical Design Tool", Custom Integrated Circuits Conference, 1987, pp. 488–491.
Howard H. Chen, "Routing L-Shaped Channels in Nonslicing-Structure Placement", 24th ACM/IEEE Design Automation Conference, 1987, paper 8.3, pp. 152–158.

*Primary Examiner*—Thomas G. Black
*Assistant Examiner*—Susan Wieland
*Attorney, Agent, or Firm*—Douglas L. Weller

[57] ABSTRACT

A method sizes routing channels used to route pads to a logic core. Six channels are defined. The six channels include a first special channel, a second special channel, a left channel, a right channel, a bottom channel and a top channel. The first special channel is immediately below the logic core and within a span of the logic core. The second special channel is immediately above the logic core and within a span of the logic core. The left channel is adjacent to a left side of the logic core, the first special channel and the second special channel. The right channel is adjacent to a right side of the logic core, the first special channel and the second special channel. The bottom channel is adjacent to a bottom side of the left channel, the first special channel and the right channel. The top channel is adjacent to a top side of the left channel, the first special channel and the right channel. Pads are positioned at a top side of the top channel, at a bottom side of the bottom channel, at a left side of the left channel and at a right side of the right channel. After performing a global route through the six channels, the six channels are re-sized based on channel density resulting from channel routing each of the six channels. The re-sizing includes repositioning the pads.

21 Claims, 6 Drawing Sheets

IMPROVED PAD RING ROUTER

BACKGROUND

The present invention concerns an improved router used to connect core logic of a very large scale integrated (VLSI) circuit to a ring of I/O pads.

Once the logic for a VLSI integrated circuit has been developed, it is necessary to lay out the core logic for placement on a wafer die. Logic cells are arranged in mega-cell blocks. The mega-cell blocks are placed in a floor planning stage. Within the mega-cell blocks, standard logic cells are placed. This is followed by global routing of connectors between mega-cell blocks, and detail routing between standard logic cells within each mega-cell. Finally, pad ring routing is performed to interconnect the core logic to I/O pads of the circuit. The I/O pads will be bonded to package pins through bond wires.

When placing I/O pads on a wafer die, certain limitations are taken into account. For example, I/O pads must be placed on a wafer die so that bond wires will not cross. Additionally, it is generally required that bond wire length not exceed a specified maximum length. Also, the bond wire angle (the larger angle between the wire and the die edge) should be less than a specified maximum angle. Because of these bond limitations, it is generally desirable to place at least some I/O pads as close to the corners of a wafer die as possible.

Various methods are used to perform pad ring routing of I/O pads to core logic in a VLSI circuit. For example, a slicing structure with four channels may be used. In such a scheme, the pad ring is divided into four channels. The left and right channels are routed first, then the top and bottom channels. This method has several disadvantages. For example, big indentations in the top and bottom channels lead to inefficient routing. Further, because of the height of the top and bottom channels, gaps will result in the corners of the wafer die where it will be impossible to place I/O pads.

Alternately, moat routing may be used. See for example, Richard K. McGehee, *A Practical Moat Router*, 24th ACM/IEEE Design Automation Conference, 1987, pages 216–221. A moat is a channel bent into a ring, so that the horizontal tracks become concentric and the vertical columns become radial. A channel router can be modified to route the moat when the moat is unrolled. However, in the unrolled channel, trapezoids are connected at corner regions. If an I/O pad exists in one of these corner regions, a track for the I/O pad must be assigned so that it does not cause conflict with other nets padding through the corner area. A corner conflict can be resolved by moving the I/O pad a distance from the corner. This, however, can result in a gap between in the corners where no I/O pads are present. Further, the thickness of the moat is the same as the height or density of the channel. If the density is overestimated, the channel will be expanded and there will again be a large gap in the corners where there are no I/O pads. If the density is underestimated, the corner pads may abut preventing the channel from being compact. This can waste area of the wafer die.

A trapezoidal channel router may also be used to do pad ring routing. A floating edge between channels consists of a series of steps. Terminals between channels are placed on vertical edges of the steps. However, existing channel routers must be significantly modified to obtain such a trapezoidal channel router. Further, in the prior art use of trapezoid channel routers, there is still not significant placement of I/O pads in the corner of the wafer die.

SUMMARY OF THE INVENTION

In accordance with the preferred embodiment of the present invention, a method is presented for sizing routing channels used to route pads to a logic core. In the method, six channels are defined. The six channels include a first special channel, a second special channel, a left channel, a right channel, a bottom channel and a top channel. The first special channel is immediately below the logic core and within a span of the logic core. The second special channel is immediately above the logic core and within a span of the logic core. The left channel is adjacent to a left side of the logic core, the first special channel and the second special channel. The right channel is adjacent to a right side of the logic core, the first special channel and the second special channel. The bottom channel is adjacent to a bottom side of the left channel, the first special channel and the right channel. The top channel is adjacent to a top side of the left channel, the first special channel and the right channel. Pads are positioned at a top side of the top channel, at a bottom side of the bottom channel, at a left side of the left channel and at a right side of the right channel.

A height of the first special channel and a height of the second special channel are estimated and the special channels resized. This is done, for example, after global routing the six channels. In the preferred embodiment, the global routing is performed by first forming ten regions. The first special channel, the second special channel, the left channel and the right channel each constitute a single region. The top channel and the bottom channel each constitute three regions.

A cost is assigned for nets intersecting the regions. The cost includes wire length cost, channel density cost and a special region cost. The special region cost is highest for nets which intersect adjacent regions within the top channel and for nets which intersect adjacent regions within the bottom channel. The special region cost is lowest for nets which intersect the region within the first special channel or the region within the second special channel. Nets are routed based on minimizing costs, for example, using a single component growth algorithm.

Estimation of the height of the first and second special channels includes fixing connections for the first special channel and the second special channel, and includes estimating maximum channel density within the first special channel and the second special channel. When fixing connections around the first special channel, for each pad on a bottom side of the bottom channel and within the span of the logic core, a connector is placed on a border of the bottom channel and the first special channel. The connector is placed immediately above the pad. Likewise, for each pad on the top side of the top channel and within the span of the logic core, a connector is placed on a border of the top channel and the second special channel. The connector is placed immediately below the pad.

After estimating the height of the first special channel and the second special channel, the height of the left channel and the right channel are resized based on the height of the first special channel and the second special channel. Pads on the left side of the left channel and on the right side of the right channel are then repositioned to occupy the entire height of the left channel and the right channel. A width of the left channel and the right channel is estimated, for example, based on estimated channel density. A length of the top channel and the bottom channel are resized based on the estimated width of the left channel and the right channel. Pads on the top side of the top channel and on the bottom side of the right channel are repositioned to occupy the entire length of the top channel and the bottom channel. A height of the top channel and the bottom channel are estimated, for example, based on estimated channel density.

In the preferred embodiment of the present invention, resizing of channels and repositioning of pads is repeated until on a particular iteration there is no change in size in any of the six channels. When this occurs, the channels are then individually channel routed.

Also, in the preferred embodiment of the present invention, pads are positioned and repositioned so that they are spread out evenly over an adjacent channel. In an alternate preferred embodiment, however, pads are positioned and repositioned so that some pads are bunched at each end of an adjacent channel. This allows the reduction of wire bond length and wire bond angle for many of the pads.

The pad ring routing method according to the present invention allows for efficient pad ring routing while allowing pads to be placed closer to the corners of a wafer die. The close placement of pads to corners allows the minimization of wire bond length and wire bond angle.

DESCRIPTION OF THE PREFERRED EMBODIMENT

Figure 1:
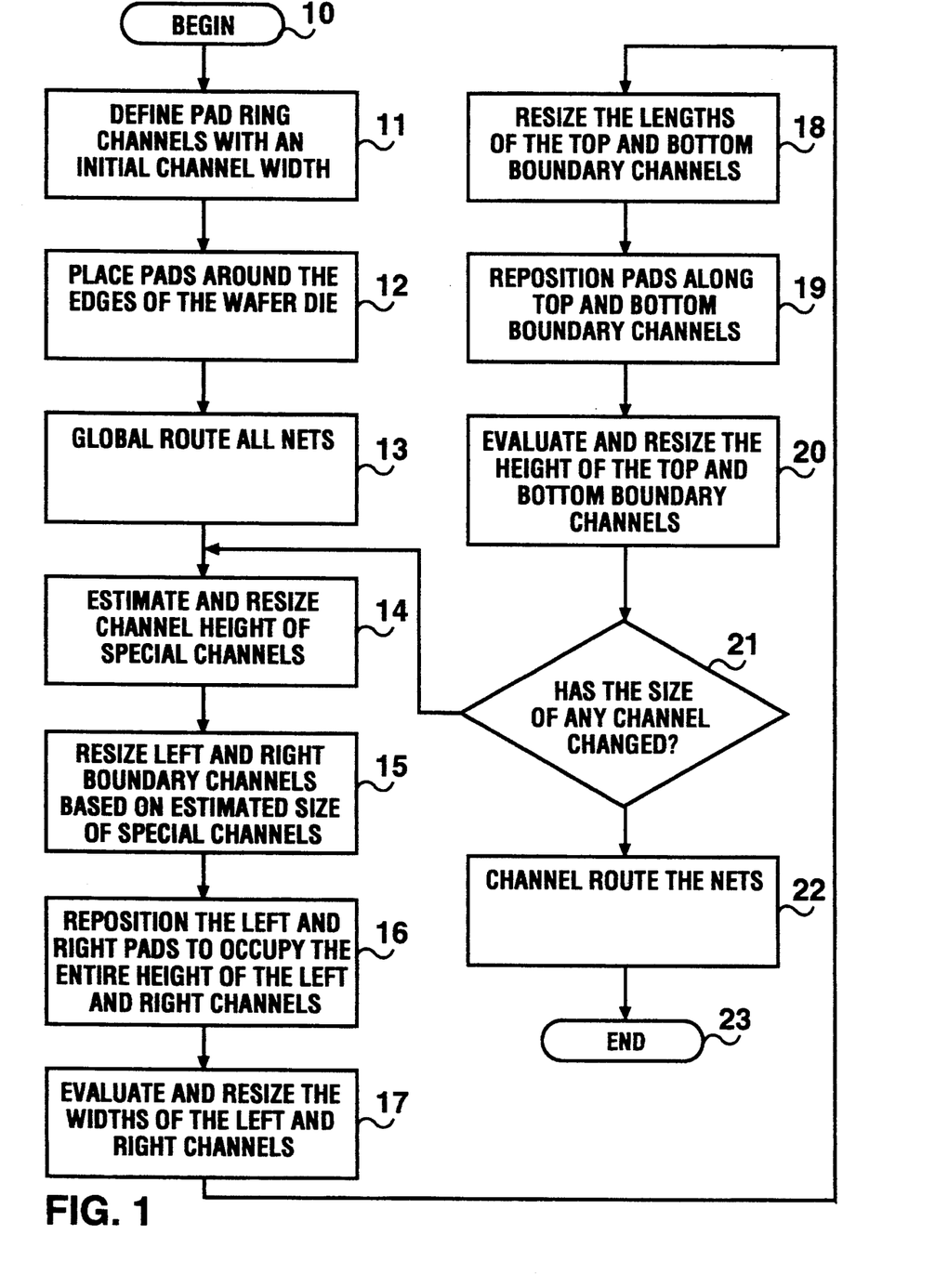
FIG. 1 is a flow chart which sets out steps for a pad ring routing method in accordance with the preferred embodiment of the present invention.

FIG. 1 shows a flowchart which outlines steps of a preferred embodiment of the present invention. The method beings in a step 10. In a step 11, pad ring channels are defined with an initial channel width or height. In a step 12, I/O pads are placed around the edge of a wafer die. The pad ring channels and I/O pads are illustrated in FIG. 2.

Figure 2:
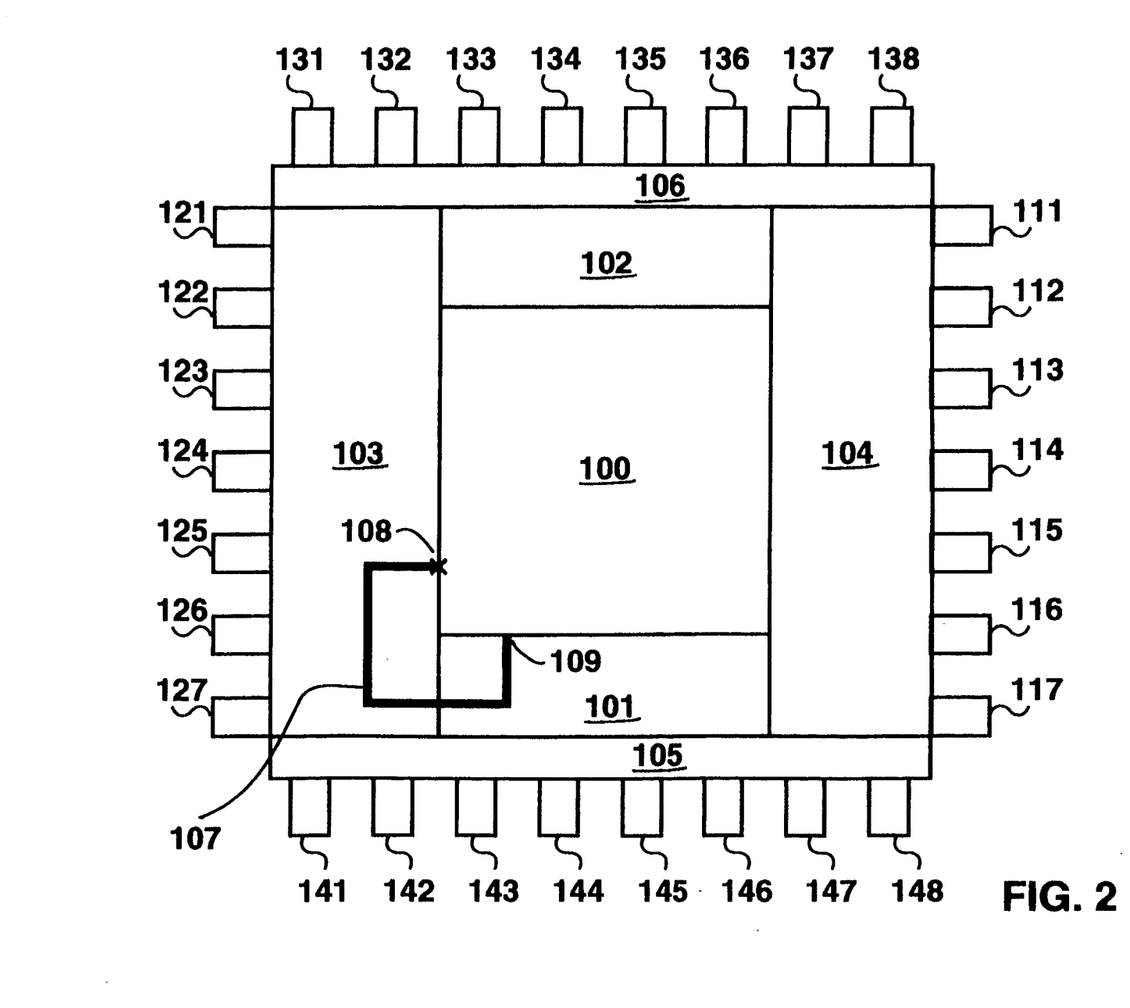
FIG. 2 shows channel definition for the pad ring routing method described in FIG. 1 in accordance with the preferred embodiment of the present invention.

As shown in FIG. 2, terminals within a logic core 100 are to be connected to I/O pads 111, 112, 113, 114, 115, 116, 117, 121, 122, 123, 124, 125, 126, 127, 131, 132, 133, 134, 135, 136, 137, 138, 141, 142, 143, 144, 145, 146, 147 and 148. The connections will be routed through a special channel 101, a special channel 102, a left channel 103, a right channel 104, a bottom channel 105 and a top channel 106. Generally, when a slicing structure is used for pad ring routing, only four channels are used. In the present invention, however, a special channel 101 and a special channel 102 are added. The advantage of the addition of the special channels is that they reduce the number of nets that need to be wired through bottom channel 105 and top channel 106. For example, a net 107 connecting a terminal 108 of logic core 100 to a terminal 109 of logic core 100 is shown. Without special channel 101, net 107 would need to be wired through bottom channel 105. With the addition of special channel 101, net 107 is routed through special channel 101 without being routed through bottom channel 105. This allows for a shorter routing length for net 107. Additionally, this also allows for the reduction of the size of bottom channel 105 and top channel 106, resulting in a smaller gap between corners of the wafer die and end I/O pads 111, 117, 121 and 127.

In a step 13, global routing of all nets is performed. The global routing may be performed using a known global routing technique. For example, the global routing scheme may be performed by a graph model. The graph model is based on regions. Top channel 106 and bottom channel 105 are each broken into three regions. For top channel 106, a first region is across the top side of left channel 103, a second region is across the span of logic core 100 (i.e., across the top side of special channel 102), and a third region is across the top side of right channel 104. For bottom channel 105, a first channel is across the bottom side of left channel 103, a second channel is across the span of logic core 100 (i.e., across the bottom side of special channel 101), and a third region is across the bottom side of right channel 104. Special channel 101, special channel 102, left channel 103 and right channel 104 are each a single region.

Figure 3:
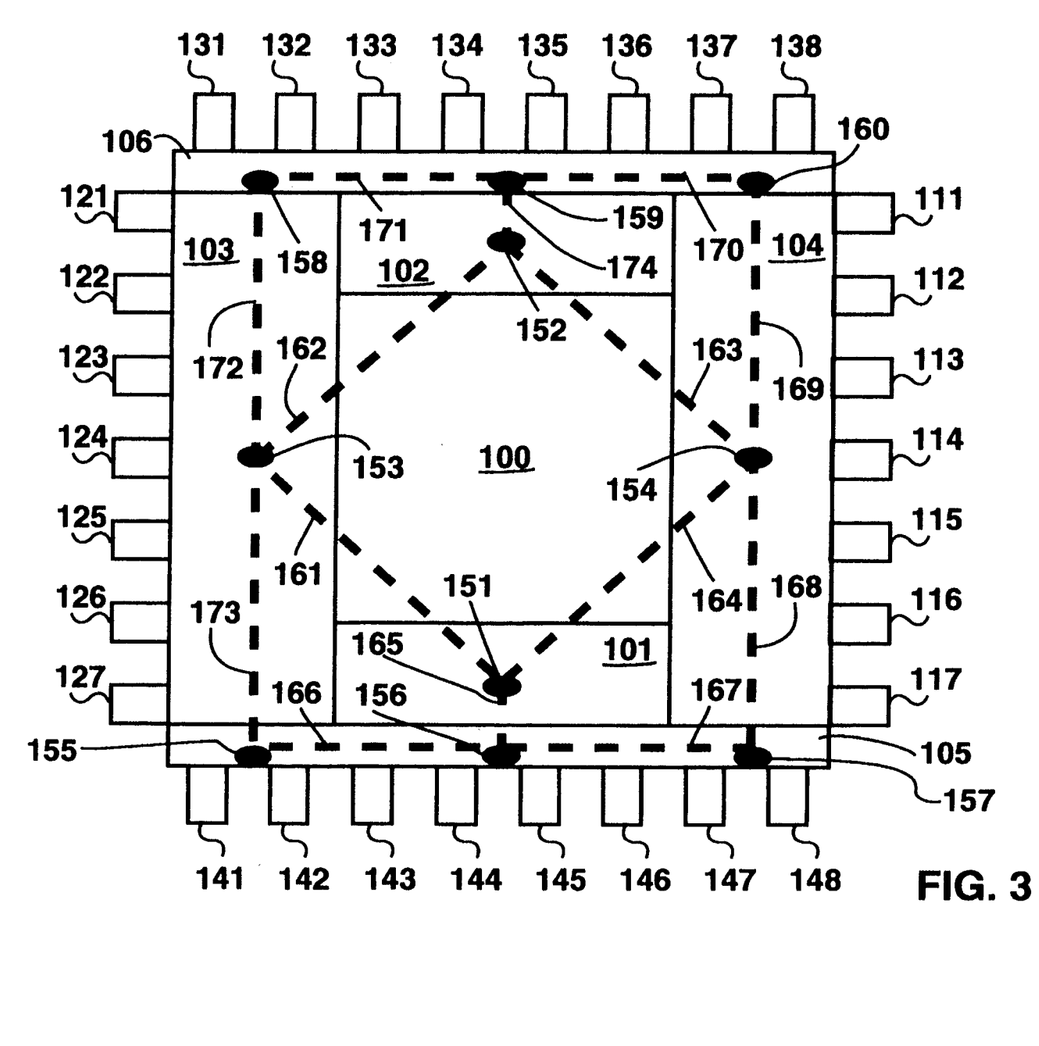
FIG. 3 shows vertices of regions used for global routing of the channels shown in FIG. 2, in accordance with the preferred embodiment of the present invention.

Each region becomes a vertex of the graph. Intersection between regions become edges of the graph. A cost is associated for each edge of the graph. The cost is the weighted sum of wire length cost, route density cost, and a special region cost. Wire length cost and route density cost may be calculated as is typical in a general global routing scheme. See, for example, Jiri Soukup, *Circuit Layout*, Proceedings of the IEEE, Vol. 69, No. 10, October 1981, pp. 1281–1304. The special region cost is obtained by multiplying an edge length by an edge weight for each edge. Based on the calculated cost, Dijkstra's single component growth algorithm is used to find the least expensive path for each net. See for example, Chen, N. P., *New Algorithms for Steiner Tree of Graphs*, Proceedings ISCAS, 1983, pp. 1217–1219.

For example, as shown in FIG. 3, special channel 101 has a vortex 151. Special channel 102 has a vortex 152. Left channel 103 has a vortex 153. Right channel 104 has a vortex 154. Bottom channel 105 contains a vortex 155, a vortex 156 and a vortex 157. Top channel 106 contains a vortex 158, a vortex 159 and a vortex 160.

Edge weights for edges between vortexes are set so that all routing around the corners of logic core 100 is pulled into special channel 101 or special channel 102. The edge weights are additionally set so that all I/O pads on top or bottom of the wafer die that are within the span of logic core 100 are pulled straight through top channel 106 or bottom channel 105, respectively. For example, an edge weight of two hundred is used for a net through an edge 166, an edge 167, an edge 170 or an edge 171. An edge weight of twenty is used for a net through an edge 168, an edge 169, an edge 172 or an edge 173. An edge weight of one is used for a net through an edge 161, an edge 162, an edge 163, an edge 164, an edge 165 or an edge 174.

In a step 14 shown in FIG. 1, after global routing, an estimate and resizing of the height of special channel 101 and special channel 102 is performed. Step 14 includes three substeps. In a first substep, a connector positioning scheme is used to place connectors between bottom channel 105 and special channel 101, and is used to place connectors between top channel 106 and special channel 102. For each of I/O pads adjacent to top channel 106 which are within the span of logic core 100, a connector for the net connected to the I/O pad is placed directly under the I/O pad at the border of top channel 106 and special channel 102. Similarly, for each of I/O pads adjacent to bottom channel 105 which are within the span of logic core 100, a connector for the net connected to the I/O pad is placed directly over the I/O pad at the border of bottom channel 105 and special channel 101.

Figure 4:
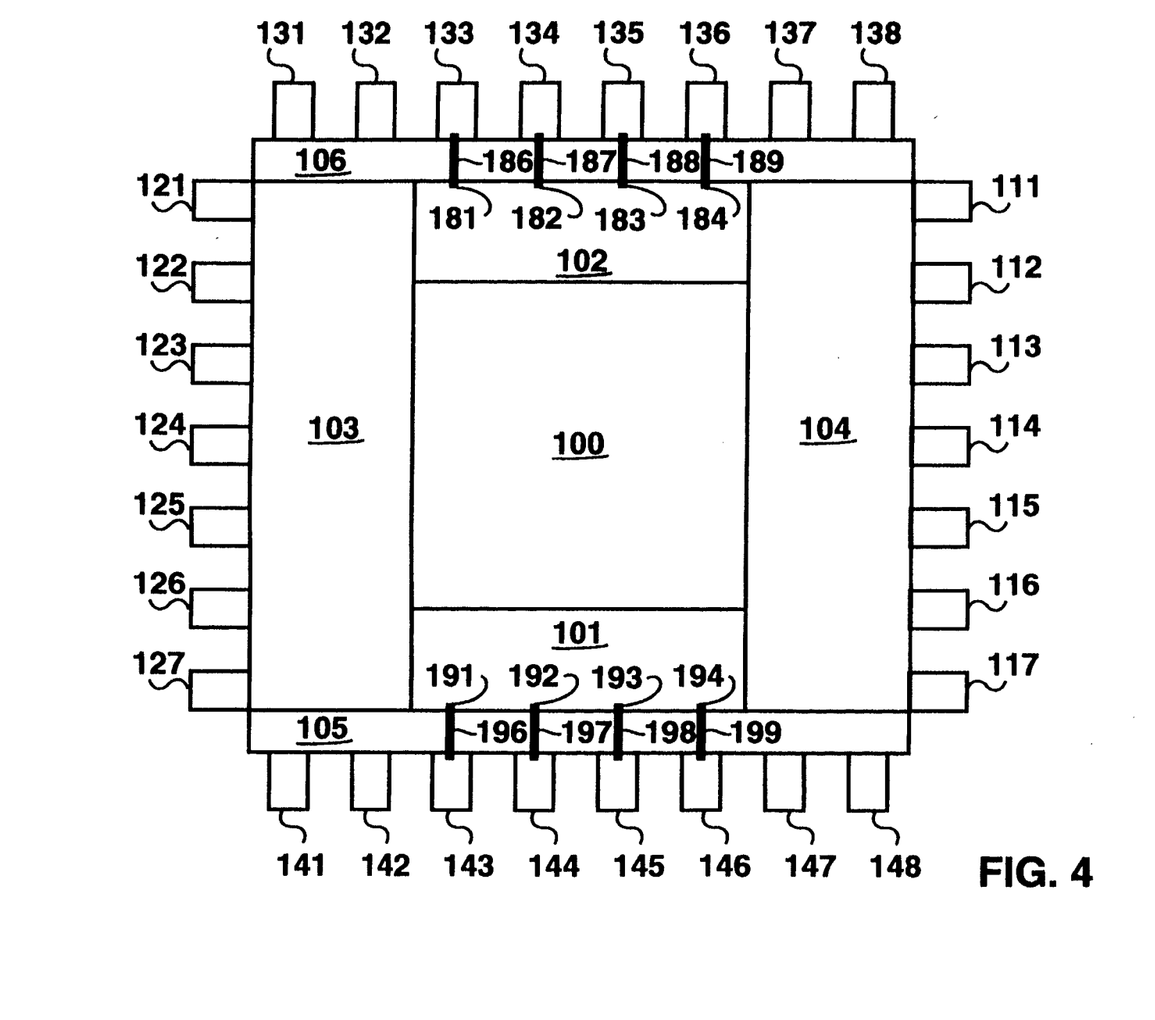
FIG. 4 shows connector positioning on the border of special channels shown in FIG. 2, in accordance with the preferred embodiment of the present invention.

For example, FIG. 4 shows a connector 181 placed directly below I/O pad 133 on the border of top channel 106 and special channel 102. Similarly, connector 182 is placed directly below I/O pad 134, connector 183 is placed directly below I/O pad 135 and connector 184 is placed directly below I/O pad 136. Likewise, FIG. 4 shows a connector 191 placed directly above I/O pad 143 on the border of bottom channel 105 and special channel 101. Similarly, connector 192 is placed directly above I/O pad 144, connector 193 is placed directly above I/O pad 145 and connector 194 is placed directly above I/O pad 146.

Because of the routing costs described above, I/O pad 133 will be routed to connector 181 through a path 186. Similarly, I/O pad 134 will be routed to connector 182 through a path 187, I/O pad 135 will be routed to connector 183 through a path 188 and I/O pad 136 will be routed to connector 184 through a path 189. Likewise, I/O pad 143 will be routed to connector 191 through a path 196, I/O pad 144 will be routed to connector 192 through a path 197, I/O pad 145 will be routed to connector 193 through a path 198 and I/O pad 146 will be routed to connector 194 through a path 199. Thus, the only horizontal routing in top channel 106 and bottom channel 105 is routing to certain of the corner pads on the top and bottom of the wafer die not within the span of logic core 100, which may not be aligned with floating connectors respectively on the top and the bottom side of left channel 103 and right channel 104. This minimizes the height of top channel 106 and bottom channel 105.

Any change in size of any boundary channels will result in step 14 being repeated. Therefore, in a second substep of step 14, a check is made to see if any change in boundary channel size and/or an accompanying repositioning of I/O pads has resulted in an I/O pad either moving within the span of logic core 100, or moving outside the span of logic core 100. If so, the global routing for nets which include these pads are modified. The modification is made so that if and only if a pad is within the span of logic core 100, a net for the pad will be routed directly through either bottom channel 105 or top channel 106 to a special channel. For example, if repositioning of the pads results in pad 132 (shown in FIG. 4) being placed within the span of logic core 100, the global routing would be modified so that the net for pad 132 would be routed directly through top channel 106 to special channel 102. On the other hand, if repositioning of the pads resulting in pad 133 being placed outside the span of logic core 100, the global routing would be modified so that the net for pad 133 would be routed through top channel 106 to left channel 103 and then to special channel 102.

Figure 5:
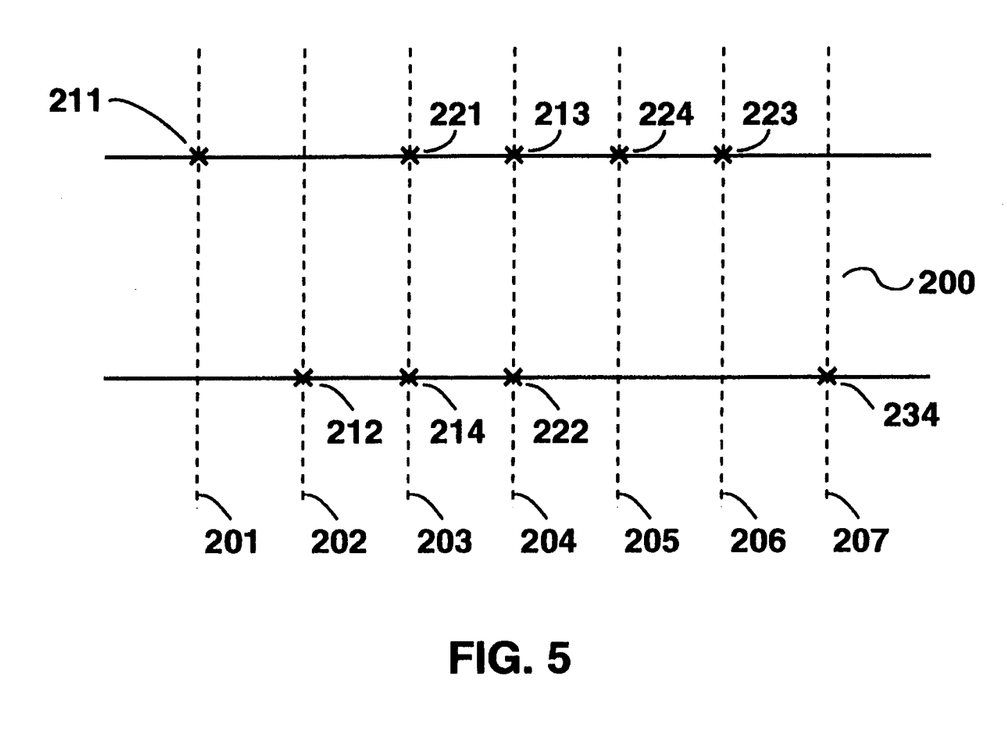
FIG. 5 shows a diagram used to explain estimation of channel height in accordance with the preferred embodiment of the present invention.

In the third substep of step 14, the height of special channel 101 and special channel 102 is estimated and special channel 101 and special channel resized, if necessary, so that there is sufficient room (while eliminating excess room) for all the nets. FIG. 5 shows an example of how a channel height (or width) estimate is done. On boundaries of an example channel 200 are placed a connector 211 and a connector 221 for a first net. A connector 212 and a connector 222 are placed for a second net. A connector 213 and a connector 223 are placed for a third net. A connector 214, a connector 224 and a connector 234 are placed for a fourth net.

In FIG. 5, a routing grid 201, a routing grid 202, a routing grid 203, a routing grid 204, a routing grid 205, a routing grid 206 and a routing grid 207 are also shown. As may be seen, when channel 200 is routed, at routing grid 201, the first net will be present. At routing grid 202, the first net and the second net will be present. At routing grid 203, the first net, the second net and the fourth net will be present. At routing grid 204, the second net, the third net and the fourth net will be present. At routing grid 205, the third net and the fourth net will be present. At routing grid 206, the third net and the fourth net will be present. At routing grid 207, the fourth net will be present. Therefore, at routing grid 203 and routing grid 204, the channel density will be at a maximum, requiring room for three nets. Routing channel 200, therefore, must be resized so that there is sufficient room for three nets.

In a step 15 shown in FIG. 1, after the estimation and resizing of channel height of special channel 101 and special channel 102, the height of left channel 103 and right channel 104 are resized in order to take into account any change of size in special channel 101 and special channel 102.

In a step 16, I/O pads on the left side (I/O pads 121–127) and on the right side (I/O pads 111–117) of the wafer die are repositioned to take into account any change in the height of left channel 103 and right channel 104.

In a step 17, the width of left channel 103 and right channel 104 are resized to take into account any repositioning of the I/O pads and any change in size of change in the height of left channel 103 and right channel 104. The channel sizing of left channel 103 and right channel 104 is done similarly to the example sizing of channel 200 shown in FIG. 5, as discussed above.

In a step 18, the length of bottom channel 105 and top channel 106 are resized in order to take into account any change of size in left channel 103 and right channel 104.

In a step 19, I/O pads on the top (I/O pads 131–138) and on the bottom (I/O pads 141–148) of the wafer die are repositioned to take into account any change in the length of bottom channel 105 and top channel 106.

In a step 20, the height of bottom channel 105 and top channel 106 are resized to take into account any repositioning of the I/O pads and any change in the length of bottom channel 105 and top channel 106. The channel sizing of bottom channel 105 and top channel 106 is done similarly to the example sizing of channel 200 shown in FIG. 5, as discussed above.

In a step 21, a check is made to see if performance of step 14 through step 20 has resulted in the size of any channel being changed. If so, another iteration of the method is performed beginning at step 14. The iterations continue until the check at step 20 reveals that the latest iteration has not resulted in the size of any channel being changed.

In a step 22, the boundary channels are channel routed. The channel routing is performed, for example, in the following order: special channel 101, special channel 102, left channel 103, right channel 104, bottom channel 105 and top channel 106. For an example of a channel router, see Charles H. Ng, *An Industrial World Channel Router For Non-Rectangular Channels*, 23rd Design Automation Conference, 1986, pp. 490-494. In a step 23, the method has been completed. Typically, the method may take three iterations of steps 14 through 21.

In FIGS. 2 through 4, the I/O pads 111-117, 121-127, 131-138 and 141-148 are shown spread out evenly over the sides and top of the wafer die, with the exception that no I/O pads are placed on the sides of bottom channel 105 and top channel 106. However, in an alternate preferred embodiment of the present invention, some of the I/O pads are bunched in the corners of the wafer die. This reduces the bonding wire length and the bonding wire angle for bonding wire connected to many of the I/O pads.

Figure 6:
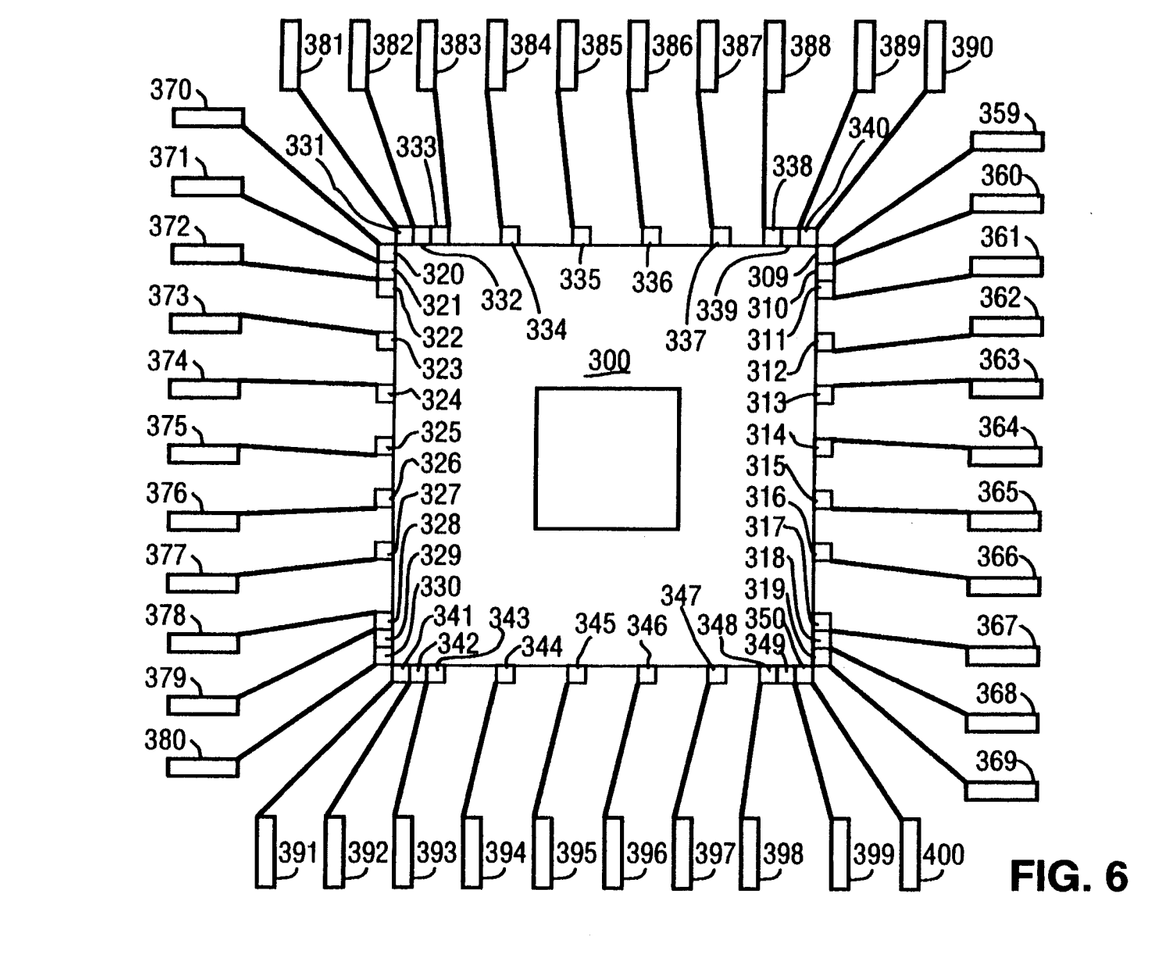
FIG. 6 shows positioning of pads along borders of a wafer die in accordance with an alternate preferred embodiment of the present invention.

This is illustrated by FIG. 6. In FIG. 6, I/O pads 309 through 350 are shown distributed around the edges of wafer die 300. In the corners of wafer die 300, I/O pads are bunched into groups. For example, on the top of wafer die 300, I/O pads 331, 332 and 333 are bunched on the left side and I/O pads 338, 339 and 340 are bunched on the right side. I/O pads 334, 335, 336 and 337 are spread out evenly between I/O pad 333 and I/O pad 338. On the bottom side of wafer die 300, I/O pads 341, 342 and 343 are bunched on the left side and I/O pads 348, 349 and 350 are bunched on the right side. I/O pads 344, 345, 346 and 347 are spread out evenly between I/O pad 343 and I/O pad 348. On the right side of wafer die 300, I/O pads 309, 310 and 311 are bunched on the top and I/O pads 317, 318 and 319 are bunched on the bottom. I/O pads 312, 313, 314, 315 and 316 are spread out evenly between I/O pad 311 and I/O pad 317. On the left side of wafer die 300, I/O pads 320, 321 and 322 are bunched on the left side and I/O pads 328, 329 and 330 are bunched on the right side. I/O pads 323, 324, 325, 326 and 327 are spread out evenly between I/O pad 322 and I/O pad 328.

When wafer die 300 is packaged, I/O pads 309 through 350 are connected by bonding wires to package pins 359 through 400. Since the package for wafer die 300 is always significantly bigger than the wafer die, the bunching of certain of the I/O pads in the corners of wafer die has a significant positive impact on the shortening of the bonding wire length and the reduction of bonding wire angle for certain of the I/O pads.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for sizing routing channels used to route input/output pads to a logic core, the method comprising the steps of:

(a) defining six channels, the six channels including a first special channel immediately below the logic core and within a span of the logic core, a second special channel immediately above the logic core and within a span of the logic core, a left channel adjacent to a left side of the logic core, the first special channel and the second special channel, a right channel adjacent to a right side of the logic core, the first special channel and the second special channel, a bottom channel adjacent to a bottom side of the left channel, the first special channel and the right channel, and a top channel adjacent to a top side of the left channel, the second special channel and the right channel, whereby use of the first special channel and the second special channel reduces it number of nets wired through the top channel and the bottom channel;

(b) positioning input/output pads at a top side of the top channel, at a bottom side of the bottom channel, at a left side of the left channel and at a right side of the right channel;

(c) estimating a height of the first special channel and the second special channel;

(d) resizing a height of the left channel and the right channel based on the height of the first special channel and the second special channel estimated in step (c);

(e) repositioning input/output pads on the left side of the left channel and on the right side of the right channel to occupy the entire height of the left channel and the right channel;

(f) estimating a width of the left channel and the right channel;

(g) resizing a length of the top channel and the bottom channel based on the width of the left channel and the right channel estimated in step (f);

(h) repositioning input/output pads on the top side of the top channel and on the bottom side of the bottom channel to occupy the entire length of the top channel and the bottom channel; and, (i) estimating a height of the top channel and the bottom channel.

2. A method as in claim 1 wherein before step (c) the following step is performed:

(b.1) global routing the six channels.

3. A method as in claim 2 wherein step (c) includes the substeps of:

(c.1) fixing connections for the first special channel and for the second special channel; and, (c.2) estimating maximum channel density within the first special channel and the second special channel.

4. A method as in claim 3 wherein step (f) includes estimating maximum channel density within the left channel and the right channel, and wherein step (i) includes estimating maximum channel density within the top channel and the bottom channel.

5. A method as in claim 3 wherein substep (c.1) includes the following substeps:

(c.1.i) for each input/output pad on a bottom side of the bottom channel and within the span of the logic core, placing a connector on a border of the bottom channel and the first special channel, the connector being immediately above the input/output pad; and, (c.1.ii) for each input/output pad, on a top side of the top channel and within the span of the logic core, placing a connector on a border of the top channel and the second special channel, the connector being immediately below the input/output pad.

6. A method as in claim 3 wherein step (b.1) includes the following substeps:
   (b.1.i) forming ten regions wherein the first special channel constitutes a single region, the second special channel constitutes a single region, the left channel constitutes a single region, the right channel constitutes a single region, the top channel constitutes three regions and the bottom channel constitutes three regions;
   (b.1.ii) assigning a cost for nets intersecting the regions, the cost including a special region cost; and,
   (b.1.iii) routing nets based on minimizing costs assigned in substep (b.1.ii) for each net.

7. A method as in claim 6 wherein in substep (b.1.ii) the special region cost is highest for nets which intersect adjacent regions within the top channel and is highest for nets which intersect adjacent regions within the bottom channel, and the special region cost is lowest for nets which intersect the region within the first special channel or the region within the second special channel.

8. A method as in claim 6 wherein the cost assigned in substep (b.1.ii) additionally includes wire length cost and channel density cost.

9. A method as in claim 7 wherein substep (b.1.iii) is performed using a single component growth algorithm.

10. A method as in claim 1 additionally comprising the step of:
   (j) when performing steps (c) through (i) results in a change in size in any of the first special channel, the second special channel, the left channel, the right channel, the top channel and the bottom channel, repeating steps (c) through (j).

11. A method as in claim 10, wherein step (c) includes modifying global routing when, in prior performance of step (h), repositioning input/output pads on the top side of the top channel and on the bottom side of the bottom channel has resulted in an input/output pad on the bottom side of the bottom channel moving into or out of the span of the logic core or has resulted in an input/output pad on the top side of the top channel moving into or out of the span of the logic core.

12. A method as in claim 1 wherein in step (b), (e) and (h) input/output pads are positioned and repositioned so that they are spread out evenly over an adjacent channel.

13. A method as in claim 1 wherein in step (b), (e) and (h) input/output pads are positioned and repositioned so that some input/output pads are bunched at each end of an adjacent channel.

14. A method for routing input/output pads to a logic core, the method comprising the steps of:
   (a) defining six channels, the six channels including a first special channel immediately below the logic core and within a span of the logic core, a second special channel immediately above the logic core and within a span of the logic core, a left channel adjacent to a left side of the logic core, the first special channel and the second special channel, a right channel adjacent to a right side of the logic core, the first special channel and the second special channel, a bottom channel adjacent to a bottom side of the left channel, the first special channel and the right channel, and a top channel adjacent to a top side of the left channel, the second special channel and the right channel, whereby use of the first special channel and the second special channel reduces a number of nets wired through the top channel and the bottom channel;
   (b) positioning input/output pads at a top side of the top channel, at a bottom side of the bottom channel, at a left side of the left channel and at a right side of the right channel;
   (c) performing a global route through the six channels; and,
   (d) resizing the six channels based on estimated channel routing density of each the six channels, the resizing including repositioning of the input/output pads.

15. A method as in claim 14 wherein in step (d), resizing the first special channel and the second special channel includes the following substeps:
   (d.1) for each input/output pad on a bottom side of the bottom channel and within the span of the logic core, placing a connector on a border of the bottom channel and the first special channel, the connector being immediately above the input/output pad; and,
   (d.2) for each input/output pad on a top side of the top channel and within the span of the logic core, placing a connector on a border of the top channel and the second special channel, the connector being immediately below the input/output pad.

16. A method as in claim 14 wherein step (c) includes the following substeps:
   (c.1) forming ten regions wherein the first special channel constitutes a single region, the second special channel constitutes a single region, the left channel constitutes a single region, the right channel constitutes a single region, the top channel constitutes three regions and the bottom channel constitutes three regions;
   (c.2) assigning a cost for nets intersecting the regions, the cost including a special region cost; and,
   (c.3) routing nets based on minimizing costs assigned in substep (c.1.ii) for each net.

17. A method as in claim 16 wherein in substep (c.2) the special region cost is highest for nets which intersect adjacent regions within the top channel and is highest for nets which intersect adjacent regions within the bottom channel, and the special region cost is lowest for nets which intersect the region within the first special channel or the region within the second special channel.

18. A method as in claim 17 wherein substep (c.3) is performed using a single component growth algorithm.

19. A method as in claim 14 additionally comprising the step of:
   (e) when performing steps (d) results in a change in size in any of the first special channel, the second special channel, the left channel, the right channel, the top channel and the bottom channel, repeating steps (d) through (e).

20. A method as in claim 19 additionally comprising the step of:
   (f) channel routing nets within the first special channel, the second special channel, the left channel, the right channel, the bottom channel and the top channel.

21. A method as in claim 14 wherein in step (b) and (d) input/output pads are positioned and repositioned so that some input/output pads are bunched at each end of an adjacent channel.

* * * * *